United States Patent [19]

Kalpakci et al.

[11] Patent Number: 4,554,974

[45] Date of Patent: Nov. 26, 1985

[54] METHOD OF ENHANCED OIL RECOVERY EMPLOYING THICKENED AMPHOTERIC SURFACTANT SOLUTIONS

[75] Inventors: Bayram Kalpakci, Sagamore Hills; Keng S. Chan, South Euclid, both of Ohio

[73] Assignee: The Standard Oil Company, Cleveland, Ohio

[21] Appl. No.: 559,524

[22] Filed: Dec. 8, 1983

[51] Int. Cl.$^4$ .............................................. E21B 43/22
[52] U.S. Cl. ................................... 166/273; 166/246; 166/275; 252/8.55 D
[58] Field of Search ................. 252/8.55 D; 166/246, 166/273, 274, 275

[56] References Cited

U.S. PATENT DOCUMENTS

| | | | |
|---|---|---|---|
| 3,373,810 | 3/1968 | Williams | 252/8.55 D X |
| 4,008,165 | 2/1977 | Maddox, Jr. et al. | 252/8.55 D |
| 4,074,759 | 2/1978 | Bousaid | 252/8.55 D X |
| 4,076,743 | 2/1978 | Koch et al. | 252/8.55 D X |
| 4,130,491 | 12/1978 | Wagner et al. | 252/8.55 D |
| 4,166,038 | 8/1979 | Stournas | 252/8.55 D |
| 4,216,097 | 8/1980 | Stournas | 252/8.55 D |
| 4,259,191 | 3/1981 | Wagner | 252/8.55 D |
| 4,326,037 | 4/1982 | Griffith et al. | 166/246 X |
| 4,347,146 | 8/1982 | Abdo | 252/8.55 D |
| 4,370,243 | 1/1983 | Chen et al. | 252/8.55 D |
| 4,388,212 | 6/1983 | Richter | 252/8.55 D X |
| 4,412,925 | 11/1983 | Ballerini et al. | 166/246 X |

*Primary Examiner*—George A. Suchfield
*Attorney, Agent, or Firm*—Larry W. Evans; David J. Untener; William A. Heidrich

[57] ABSTRACT

A method is disclosed for recovering petroleum from a subterranean reservoir penetrated by at least one injection well and at least one production well comprising: injecting into the reservoir through the injection well a surfactant slug comprising an aqueous solution containing about 0.001 to about 5% by weight of an amphoteric surfactant and an effective amount of a high molecular weight homopolysaccharide gum thickener derived from fungus strains of the genus Schlerotium to provide the surfactant slug with a viscosity exceeding the viscosity of the petroleum in the reservoir; and recovering fluid from the production well.

14 Claims, No Drawings

METHOD OF ENHANCED OIL RECOVERY EMPLOYING THICKENED AMPHOTERIC SURFACTANT SOLUTIONS

TECHNICAL FIELD

This invention relates to the recovery of oil from subterranean oil reservoirs and, more particularly, to improved waterflooding operations involving the use of aqueous solutions containing certain amphoteric surfactants which are thickened by a high molecular weight homopolysaccharide gum thickener.

BACKGROUND OF THE INVENTION

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected-water, and the wettability characteristics of the rock surfaces within the reservoir are factors which influence the amount of oil recovered by waterflooding. Thus it has been proposed to add surfactants to the flood water in order to lower the oil-water interfacial tension and/or to alter the wettability characteristics of the reservoir rock. Processes which involve the injection of aqueous surfactant solutions are commonly referred to as surfactant waterflooding or as low tension waterflooding, the latter term having reference to the mechanism involving the reduction of the oil-water interfacial tension. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

A problem with stability and effectiveness arises when these surfactants and thickeners are used in environments characterized by high temperatures (e.g., 160°–240° F.), high pressures (e.g., up to 4000 psi), high concentrations of divalent and trivalent metal ions such as calcium, magnesium, boron, barium, iron, etc. (e.g., up to 3000 ppm or more and in some instances as high as 10,000 or 20,000 ppm), high salinity (e.g., when the floodwater is sea water), and low or high pH (e.g., pH in the range of about 3 to about 11).

Many waterflooding applications have employed anionic surfactants. For example, a paper by W. R. Foster entitled "A Low-Tension Waterflooding Process", Journal of Petroleum Technology, Vol. 25, February 1973, pp. 205–210, describes a technique involving the injection of an aqueous solution of petroleum sulfonates within designated equivalent weight ranges and under controlled conditions of salinity. The petroleum sulfonate slug is followed by a thickened water slug which contains a viscosifier such as a water-soluble biopolymer. This thickened water slug is then followed by a driving fluid such as a field brine which is injected as necessary to carry the process to conclusion.

One problem encountered in waterflooding with certain of the anionic surfactants such as the pertroleum sulfonates is the lack of stability of these surfactants in so-called "hard water" environments. These surfactants tend to precipitate from solution in the presence of even low concentrations of divalent metal ions such as calcium and magnesium ions. Typically, divalent metal ion concentrations of about 50–100 ppm and above tend to cause precipitation of the petroleum sulfonates.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use would not be economically feasible for several reasons. Nonionic surfactants are not as effective on a per mole basis as are the more commonly used anionic surfactants, and furthermore, the nonionic surfactants have a higher cost per unit weight than do the anionic surfactants. Moreover, polyethoxylated alkyl phenol nonionic surfactants exhibit a reverse solubility relationship with temperature and become insoluble at temperatures of above about 125° F. making them ineffective in many oil formations. Nonionic surfactants that remain soluble at elevated temperatures are generally not effective in reducing interfacial tension. Other types of nonionic surfactants hydrolyze at temperatures above about 165° F.

The use of certain combinations of anionic and nonionic surfactant to combat hard water formations is also taught in the art. For example, U.S. Pat. No. 3,811,505 discloses the use of alkyl or alkylaryl sulfonates or phosphates and polyethoxylated alkyl phenols. U.S. Pat. No. 3,811,504 teaches the use of three component mixture including an alkyl or alkrylaryl sulfonate, an alkyl polyethoxy sulfate and a polyethoxylated alkyl phenol. U.S. Pat. No. 3,811,507 teaches the use of a water-soluble salt of a linear alkyl or alkylaryl sulfonate and a polyethoxylated alkyl sulfate.

Cationic surface active materials, such as, for example, quaternary ammoniums salts, derivatives of fatty amines and polyamines, have also been used. However, these compounds have the disadvantage of substantivity or attraction, especially towards silicate rock, and they lose their activity by adsorption.

The use of certain amphoteric surfactants which function as cationics in acid media and become anionic when incorporated in alkaline systems has been proposed. For Example, U.S. Pat. No. 3,939,911 discloses a surfactant waterflooding process employing a three-component surfactant system. The three-component surfactant system includes an alkyl or alkylaryl sulfonate such as an ammonium dodecyl benzene sulfonate, a phosphate ester sulfonate, and a sulfonated betaine such as a $C_{12}$–$C_{24}$ alkyl amido $C_1$–$C_5$ alkane dimethylammonium propane sulfonate. The several surfactant components may be employed in concentrations from about 0.05% to about 5.0% and preferably about 0.2% to about 0.5% by weight.

U.S. Pat. Nos. 4,076,743 and 4,090,969 disclose the use of compounds of the formula

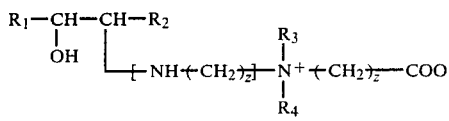

wherein $R_1$ and $R_2$ are aliphatic hydrocarbon radicals having 1 to 18 carbon atoms and/or hydrogen, wherein the sum of the carbon atoms of $R_1$ and $R_2$ is 9 to 18, $R_3$ and $R_4$ can be the same or different and represent lower alkyl or lower alkylol groups, X represents an integer of 2 to 4, y represents either 0 or 1, and z represents an integer of from 1 to 4. These compounds are disclosed as being useful as interfacial-active agents in flood water in the extraction of mineral oil and as having satisfactory solubility in formation water having a high salt content.

U.S. Pat. No. 4,130,491 discloses the use of compounds of the following formula in surfactant waterflooding:

$$R^1-NH-R^2-\overset{R^4}{\underset{R^3}{N^+}}-R^5-COO-$$

wherein $R^1$ is an acid residue derived from the naphthenic acids; $R^2$ is an alkylene residue with 2 to 6 carbon atoms; $R^3$ and $R^4$ may be the same or different and preferably represent a low molecular weight alkyl residue, especially a straight-chain alkyl residue with 1 to 4 carbon atoms; and $R^5$ is an alkylene residue with preferably 1 to 3 carbon atoms.

U.S. Pat. No. 4,193,452 discloses the use in surfactant waterflooding of the combination of a $C_5-C_8$ aliphatic alcohol with amphoteric sulfonate surfactants of the formulae $$R_1-\overset{R_2}{\underset{R_3}{^+N}}-R_4SO_3$$

or $$R_5-\overset{R_6}{\underset{R_7}{^+N}}-R_4SO_3$$

wherein $R_1$ is a hydrocarbyl group containing from 8 to 26 carbon atoms; $R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3; $R_4$ is an aliphatic group containing from 1 to 6 carbon atoms; and $R_5$, $R_6$ and $R_7$ are aliphatic hydrocarbyl groups containing in combination a total number of carbon atoms within the range of 17 to 24 and at least two of $R_5$, $R_6$ and $R_7$ containing at least 8 carbon atoms.

U.S. Pat. No. 4,216,097 discloses the use in surfactant waterflooding of an amphoteric surfactant of the formula $$R_1-\overset{R_2}{\underset{R_3}{^+N}}-R_4A^-$$

wherein $R_1$ is a hydrocarbyl group containing from 8 to 26 carbon atoms; $R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3; $R_4$ is an aliphatic group containing from 1 to 6 carbon atoms; and A is a sulfonate group or a carboxylate group.

U.S. Pat. No. 4,259,191 discloses the use in surfactant waterflooding of sulfobetaines of the formula $$R^1-NH_x-R^2-\overset{R^3}{\underset{R^4{}_x}{N^+}}-R^5-SO_3^-$$

wherein $R^1$ is naphthenoyl residue derived from naphthenic acid; $R^2$ is an alkylene residue with 2 to 6 carbon atoms; $R^3$ and $R^4$ are the same or different and are alkyl groups of 1 to 4 carbon atoms; $R^5$ is an alkylene residue of 1-4 carbon atoms; and x is 0 or 1.

The use of thickening agents to increase the viscosity of injected water, normally to a value of at least equal to that of the reservoir oil, in order to arrive at a favorable mobility ratio between the oil and water and increase the macroscopic displacement efficiency of waterflood is known. Examples of such thickeners or mobility control agents are Polysaccharide B-1459 available from Kelco Company under the tradename "Kelzan" or the partially hydrolyzed polyacrylamides available from the Dow Chemical Company under the tradename "Pusher" chemicals. Problems have arisen with many of these thickeners. Some undergo a marked decrease in viscosity of relatively high temperatures and therefore are not sufficiently thermally stable for use in oil fields having relatively high temperatures (e.g., 160°-240° F.). Many are also relatively difficult to inject, have a relatively low tolerance to divalent and trivalent metal ions, and/or have poor shear stability.

While many surfactants and thickeners have been proposed for supplemental recovery use, there is a substantial, unfilled need for a surfactant/thickener system that is usable for recovering hydrocarbons from oil formations of high temperature, high salinity, high pressure, high concentrations of divalent and trivalent metal ions, and high or low pH.

SUMMARY OF THE INVENTION

The present invention contemplates the provision of a method for recovering petroleum from a subterranean reservoir. The method is particularly suitable for use with reservoirs that are characterized by high temperatures, high salinity, high pressure, high concentrations of divalent and trivalent metal ions, and a low or high pH. The present invention provides for a method for recovering petroleum from a subterranean reservoir penetrated by injection well means and spaced production well means comprising:

injecting into said reservoir through said injection well means a surfactant slug comprising an aqueous solution containing (A) about 0.001 to about 5 percent by weight of an amphoteric surfactant of the formula

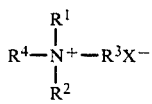

wherein X is $SO_3^-$ or $COO^-$, $R^1$ is a hydrocarbon-based group of 1 to about 14 carbon atoms, $R^2$ is a hydrocarbon-based group of 1 to about 5 carbon atoms, $R^3$ is a divalent hydrocarbon-based group of 1 to about 3 carbon atoms, and $R^4$ is a hydrocarbon-based group of about 8 to about 28 carbon atoms or is

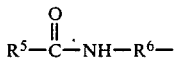

wherein $R^5$ is a hydrocarbon-based group of about 6 to about 26 carbon atoms and $R^6$ is a divalent hydrocarbon-based group of 1 to about 6 carbon atoms, and (B) an effective amount of a high molecular weight homopolysaccharide gum thickener derived from fungus strains of the genus Schlerotium to provide said surfactant slug with a viscosity exceeding the viscosity of said petroleum in said reservoir; and recovering fluid from said production well means.

In a preferred embodiment, the method includes the steps of injecting into said reservoir through said injection well means a buffer slug to follow said surfactant slug, said buffer slug comprising an aqueous solution containing an effective amount of said thickener to provide said buffer slug with a viscosity exceeding the viscosity of said surfactant slug; then injecting into said reservoir through said injection well means an aqueous flooding medium to drive fluid toward said product well means.

DESCRIPTION OF THE PREFERRED EMBODIMENTS

The method of the present invention may be carried out utilizing injection and production systems as defined by any suitable arrangement of wells. One well arrangement commonly used in waterflooding operations and suitable for use in carrying out the method of the present invention is an integrated five-spot pattern of the type illustrated in U.S. Pat. No. 3,927,716 which is incorporated herein by reference. Other well arrangements may be used in carrying out the present invention, examples of which are also set forth in the foregoing U.S. Pat. No. 3,927,716.

The term "pore volume" is used herein to mean that volume of the portion of the formation underlying the well pattern employed, as described in greater detail in the U.S. Pat. No. 3,927,716.

The amphoteric surfactants that are used in accordance with the method of the present invention are the betaines represented by the formula

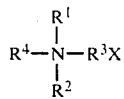

wherein X is $SO_3^-$ or $COO^-$, $R^1$ is a hydrocarbon-based group of 1 to about 14 carbon atoms, $R^2$ is a hydrocarbon-based group of 1 to about 5 carbon atoms, $R^3$ is a divalent hydrocarbon-based group of 1 to about 3 carbon atoms which can be unsubstituted or hydroxy-substituted

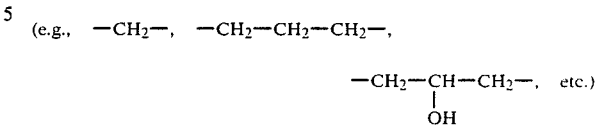

and $R^4$ is a hydrocarbon-based group of about 8 to about 28 carbon atoms, preferably about 16 to about 22 carbon atoms, or is

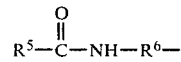

wherein $R^5$ is a hydrocarbon-based group of about 6 to about 26 carbon atoms and $R^6$ is a divalent hydrocarbon-based group of about 1 to about 6 carbon atoms. $R^1$ is preferably methyl when $R^2$ is methyl. $R^1$ and/or $R^2$ can also be hydroxy-substituted, (e.g., $-CH_2CH_2OH$). $R^3$ is preferably methylene. $R^4$ can be an alkyl, dialkyl, alkenyl, alkylaryl or alkyleneoxy. When $R^4$ is alkenyl, there is generally one ethylenic ($-C=C-$) linkage which is preferably near the middle of the chain. When $R^4$ is alkylaryl, it generally has the formula

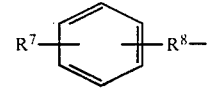

wherein $R^7$ is hydrogen or a hydrocarbon-based group of 1 to about 20 carbon atoms and $R^8$ is a divalent hydrocarbon-based group of 1 to about 20 carbon atoms. $R^4$ can also contain a nitrogen atom in a ring or chain. When $R^4$ is alkyleneoxy, it is generally represented by the formula

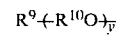

wherein $R^9$ is a hydrocarbon-based group of about 6 to about 26 carbon atoms, $R^{10}$ is a divalent hydrocarbon-based group of about 2 to about 18 carbons, preferably about 2 to about 3 carbon atoms, and y is an integer of from 1 to about 4.

The term "hydrocarbon-based", when used throughout this specification and in the appended claims, denotes a compound, composition and so forth having predominantly hydrocarbon character within the context of the invention. Such materials include the following:

1. Hydrocarbon compounds, compositions, etc., that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic materials, and the like.

2. Substituted hydrocarbon compounds, compositions, etc., materials containing non-hydrocarbon substituents which, in the context of this invention, do not alter the predominantly hydrocarbon character of the material. Those skilled in the art will be aware of suitable substituents: examples are:

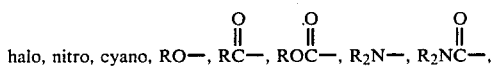

(R being hydrogen or a hydrocarbon group).

3. Hetero compounds, compositions, etc.; that is, materials which, while predominantly hydrocarbon in character within the context of this invention, contain atoms other than carbon present in a chain or ring otherwise composed of carbon atoms. Suitable hetero atoms will be apparent to those skilled in the art and include, for example, oxygen and nitrogen.

In general, no more than about three substituents or hetero atoms, and preferably no more than one, will be present for each ten carbon atoms in the hydrocarbon-based compound, composition or material.

The sulfonate derivatives wherein X is $SO_3-$ may be prepared by any suitable technique such as the reaction of a tertiary amine with a sulfone as disclosed in Parris et al, "Soap-Based Detergent Formulations. V. Amphoteric Lime Soap Dispersing Agents", Journal of the American Oil Chemist Society, Vol. 50, pp. 509–512 (1973), and U.S. Pat. Nos. 3,280,179 and 3,660,470, which are incorporated herein by reference. An alternative synthesis procedure involves the reaction of a tertiary amine with a halogenated alkane sulfonate such as chloroethane sulfonate as disclosed in the above U.S. Pat. No. 3,660,470.

An alternative procedure for the preparation of quaternary ammonium methane sulfones of the type useful in accordance with the process of the present invention involves the reaction of the appropriate tertiary amine with aqueous formaldehyde and sulfur dioxide. This reaction is carried out by treating a mixture of tertiary amine and formaldehyde with gaseous sulfur dioxide. The formaldehyde and amine may be dissolved in any suitable solvent such as ethanol, methanol or isopropyl alcohol.

The carboxylate derivatives wherein X is COO— may be prepared by quaternizing a tertiary amine with a chlorinated ester to form a cationic quaternary ammonium salt and then hydrolyzing the ester constituent to form the amphoteric carboxylate.

Examples of the preparation of amphoteric surfactants that are useful in accordance with the method of the present invention are disclosed in U.S. Pat. Nos. 3,939,911; 4,076,743; 4,090,969; 4,130,491; 4,193,452; 4,216,097; and 4,259,191. The disclosures of these patents are incorporated herein by reference.

Examples of commercially available amphoteric surfactants which are useful in accordance with the present invention include Lonzaine 16S, a product of Lonza, Inc., identified as cetyl betaine, and Schercotaine PAB, a product of Scher Chemicals, Inc., identified as palmityl amido betaine.

The homopolysaccharide gum thickener that is useful with the method of the present invention is a nonionic polysaccharide which has a molecular weight that is greater than about one million and is preferably in the range of about 1 to about 3.5 million. This thickener is represented by the formula

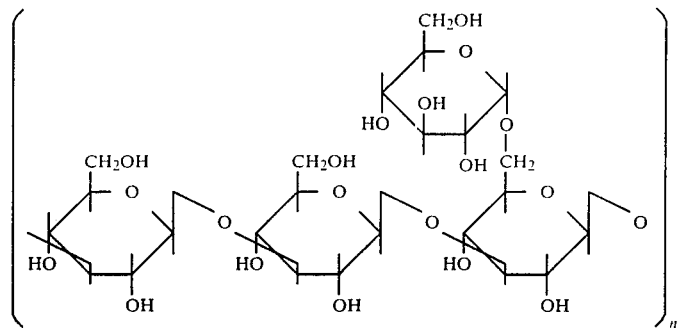

wherein n is an integer that is high enough to provide the desired molecular weight. The polymer structure is preferably a linear chain of anhydroglucose units linked beta (1–3). In a particularly advantageous embodiment about 30 to about 35 percent of the linear chain units bear single appended anhydroglucose units linked beta (1–6). This thickener is preferably cell-free and produced by selected fungus strains of the genus Schlerotium in a pure culture fermentation.

An example of a commercialy available thickener that is suitable for use in accordance with the method of the present invention ACTIGUM CS 11 L, a product of CECA S.A., Which is identified as a solution of a water-soluble gum "Scleroglucan" of highly refined grade.

The homopolysaccharide gum thickeners of the present invention have a number of significant advantages over conventional waterflooding thickeners such as polysaccharide B-1459 and the partially hydrolyzed polyacrylamides. First, the thickeners of the present invention are more thermally stable. These thickeners undergo only a moderate decrease in viscosity when temperature increases while most natural and synthetic gums undergo a marked decrease in viscosity with increase in temperature. With the thickeners of the present invention, the changes in viscosity at low concentrations are relatively small. Second, the thickeners of the present invention are easier to inject than polysaccharide B-1459 and the partially hydrolyzed polyacrylamides. Close to the injection well, flooding fluids have to flow at relatively fast rates. Shear rates can be in the range of several hundreds of $sec^{-1}$. The thickeners employed in accordance with the present invention maintain their viscosities almost unchanged after strong mechanical shearing. Third, the thickeners of the present invention have a higher salt tolerance than those of the prior art, particularly with respect to divalent and trivalent metal ions. Fourth, the viscosities of the surfactant slugs and buffer slugs of the present invention are relatively unaffected by pH variations in the range of about 3 to about 11.

The surfactant slug, buffer slug and aqueous flooding medium are injected into the subterranean reservoir in sequential order through one or more injection wells using standard techniques well known to those skilled in the art. The surfactant slug is an aqueous system containing about 0.001 to about 5 percent by weight, preferably about 0.1 to about 1 percent by weight surfactant, and about 0.05 percent to about 0.2 percent by weight, preferably about 0.05 to about 0.1 percent by weight thickener. An advantage of the present invention is that the surfactant and thickener employed have high tolerances to high levels of aqueous phase salinity as well as divalent and trivalent metal ions such as calcium, magnesium, boron, barium and iron and, accordingly, the water employed can be high salinity brine, e.g., sea water. The size of the surfactant slug ranges from about 0.2 to about 3 pore volumes.

The concentration of surfactant in the surfactant slug is preferably adjusted in accordance with the size of the slug. A surfactant slug with a pore volume of about 0.2 preferably has a surfactant concentration of about 1 to about 2 percent by weight. A surfactant slug with a pore volume of about 1 preferably has a surfactant concentration of about 0.1 to about 1 percent by weight. A surfactant slug with a pore volume of about 2 preferably has a surfactant concentration of about 0.05 to about 0.5 percent by weight.

The buffer slug has a thickener concentration of about 0.05 percent to about 0.2 percent by weight, preferably about 0.05 to about 0.1 percent by weight. Preferably, the concentration of thickener in the buffer slug is at least about 0.02 percent by weight higher than the concentration of thickener in the surfactant slug. The higher concentration of thickener in the buffer slug in relation to the concentration of thickener in the surfactant slug is essential to the effective operation of the method of the present invention to insure proper control of the relative mobilities of the surfactant slug and the buffer slug. The buffer slug preferably has a pore volume in the range of about 0.6 to about 3.

The drive fluid or aqueous flooding medium is injected into the reservoir in sequential order after the surfactant slug and buffer slug. This flooding medium is preferably water and can be any source of water, such as sea water, that is readily available.

An advantage of the method of the present invention is that it can be practiced in oil fields having relatively high temperatures, high pressures, high salinity, high concentrations of divalent and trivalent metal ions, and both high and low pH as discussed above and are encountered under various circumstances at Prudhoe Bay, the North Sea, the Persian Gulf, the Gulf of Mexico, as well as other major oil fields.

The following examples are provided for the purpose of further illustrating the method of the present invention. Unless otherwise indicated, all parts and percentages are by weight.

Oil displacement tests in Berea sandstone cores are conducted using sea water solutions of Lonzaine 16S and Actigum CS 11 L. The porous media is a 1 × 12 inch Berea or reservoir core, and the oil is stock tank oil. The results are indicated in Table I.

TABLE I

| | Example No. | | | | |
|---|---|---|---|---|---|
| | 1 | 2 | 3 | 4 | 5 |
| Surfactant Slug: | | | | | |
| Size, PV | 0.5 | 0.5 | 0.5 | 0.5 | 0.3 |
| Surfactant Concentration, % | 1.0 | 0.67 | 1.0 | 1.0 | 1.0 |
| 1.0 | 0.1 | 0 | 0 | 0 | 0 |

TABLE I-continued

| | Example No. | | | | |
|---|---|---|---|---|---|
| | 1 | 2 | 3 | 4 | 5 |
| Thickener Concentration (% Polymer) | | | | | |
| Buffer Slug: | | | | | |
| Size, PV | 0.6 | 0.6 | 0.6 | 0.6 | 0.8 |
| Thickener Concentration (% Polymer) | 0.1 | 0.1 | 0.1 | 0.1 | 0.1 |
| Porosity | 0.22 | 0.23 | 0.22 | 0.22 | 0.21 |
| Permeability, md. | 483 | 434 | 232 | 383 | 980 |
| Oil Recovery, % PV: Of Residual | 18.9 | 6.4 | 14.3 | 13.3 | 11.8 |

Example 1 is illustrative of the method of the present invention, while Examples 2–5 are provided for comparison purposes. Table I indicates that the percentage of oil recovery (18.9%) is significantly higher for Example 1 than for comparative Examples 2–5.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method for recovering petroleum from a subterranean reservoir penetrated by injection well means and spaced production well means comprising
injecting into said reservoir through said injection well means a surfactant slug comprising an aqueous solution containing: about 0.001 to about 5% by weight of an amphoteric surfactant of the formula

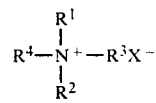

wherein $R^1$ is a hydrocarbon-based group of 1 to about 14 carbon atoms, $R^2$ is a hydrocarbon-based group of 1 to about 5 carbon atoms, $R^3$ is a divalent hydrocarbon-based group of 1 to about 3 carbon atoms, and $R^4$ is represented by the formula

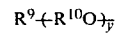

wherein $R^9$ is a hydrocarbon-based group of about 6 to about 26 carbon atoms, $R^{10}$ is a divalent hydrocarbon-based group of about 2 to about 18 carbon atoms and y is an integer of 1 to about 4, and X is $SO_3-$ or $COO-$; and an effective amount of a high molecular weight homopolysaccharide gum thickener derived from fungus strains of the genus Schlerotium to provide said surfactant slug with a viscosity exceeding the viscosity of said petroleum in said reservoir, and recovering fluid from said production well means.

2. The method of claim 1 with the steps of:
injecting into said reservoir through said injection well means a buffer slug to follow said surfactant slug, said buffer slug comprising an aqueous solution containing an effective amount of said thickener to provide said buffer slug with a viscosity exceeding the viscosity of said surfactant slug, then injecting into said reservoir through said injection well means an aqueous flooding medium to drive fluid toward said product well means.

3. The method of claim 2 wherein the amount of said buffer slug injected into said reservoir is equal to about 0.6 to about 3 pore volumes.

4. The method of claim 2 wherein the concentration of said thickener in said buffer slug is at least about 0.02 percent by weight higher than the concentration of said thickener in said surfactant slug.

5. The method of claim 2 wherein the water in said buffer slug comprises sea water.

6. The method of claim 2 wherein said aqueous flooding medium comprises sea water.

7. The method of claim 1, wherein the amount of said surfactant slug injected into said reservoir is equal to about 0.2 to about 3 pore volumes.

8. The method of claim 1 wherein said surfactant slug contains about 0.05 to about 0.2 percent by weight of said thickener.

9. The method of claim 1 wherein said surfactant slug contains 0.05 to about 0.1 to about one percent by weight of said surfactant.

10. The method of claim 1 wherein the water in said surfactant slug comprises sea water.

11. The method of claim 1 wherein $R^1$ and $R^2$ are methyl.

12. The method of claim 1 wherein $R^3$ is

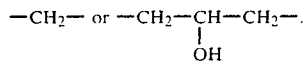

13. The method of claim 1 wherein said homopolysaccharide gum thickener has the formula

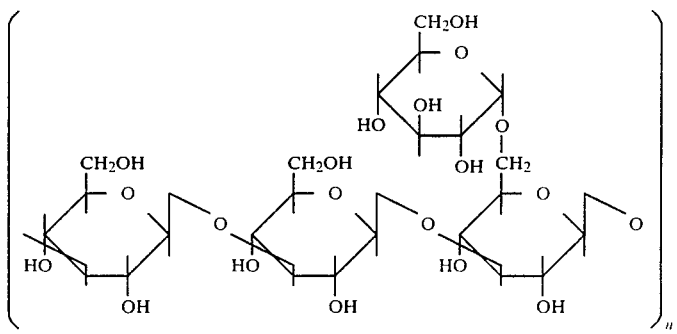

wherein n is an integer that is sufficiently high enough to provide a molecular weight of above about one million.

14. The method of claim 13 wherein said thickener is cell-free.

* * * * *